United States Patent
Loving

(10) Patent No.: US 7,426,891 B2
(45) Date of Patent: Sep. 23, 2008

(54) SYSTEM FOR CONVERTING ANIMAL WASTE INTO AN ENVIRONMENTALLY FRIENDLY ENERGY SOURCE

(76) Inventor: Ronald E. Loving, 114 Diamond Way, Fernley, NV (US) 89408

( * ) Notice: Subject to any disclaimer, the term of this patent is extended or adjusted under 35 U.S.C. 154(b) by 305 days.

(21) Appl. No.: 11/301,893

(22) Filed: Dec. 12, 2005

(65) Prior Publication Data

US 2006/0144303 A1    Jul. 6, 2006

Related U.S. Application Data

(60) Provisional application No. 60/635,368, filed on Dec. 10, 2004.

(51) Int. Cl.
*F23G 7/04* (2006.01)

(52) U.S. Cl. .................. 110/238; 110/105; 110/108; 110/106

(58) Field of Classification Search .................. 110/105, 110/108, 110, 106, 238, 346
See application file for complete search history.

(56) References Cited

U.S. PATENT DOCUMENTS

| | | | | |
|---|---|---|---|---|
| 1,628,609 | A * | 5/1927 | Newhouse | 110/106 |
| 4,683,541 | A * | 7/1987 | David | 700/274 |
| 5,572,866 | A * | 11/1996 | Loving | 60/274 |
| 6,394,072 | B1 * | 5/2002 | Yoshida et al. | 123/506 |
| 2002/0119412 | A1 * | 8/2002 | Loving | 431/252 |

* cited by examiner

*Primary Examiner*—Kenneth B Rinehart

(57) ABSTRACT

A simplified energy producing system that utilizes natural animal waste and/or by-products and converts such waste into a usable clean energy source. The system incorporates a grinder/dehydration system, waste transport, a holding container, fuel air regulator, and a novel combustion heat regulator in combination. Thus, after the waste has been treated, combusted and incinerated, intense heat is produced that is usable via heat exchange for production of electrical energy and also a fine fly ash is produced usable for environmentally friendly purposes.

4 Claims, 2 Drawing Sheets

SYSTEM FOR CONVERTING ANIMAL WASTE INTO AN ENVIRONMENTALLY FRIENDLY ENERGY SOURCE

RELATED APPLICATION

This application is derived from my provisional application No. 60/635,368, entitled "HEAT REACTOR" which was filed on Dec. 10, 2004 in the name of the current inventor. It is to be noted no new material has been entered.

FIELD OF THE INVENTION

This invention relates in general to new and improved systems used for converting animal waste by-products, manure, and/or body parts into a usable energy source such as heat/electricity, etc. The system incorporates use of a grinder/dehydration system, a holding container, air/fuel regulator means and a combustion heat generator in combination. The unusual results are mainly achieved due to use of the combustion heat generator that is used to convert the waste by-products into heat/electrical energy. The combustion heat generator uses either liquid or gaseous fuel to start the process and thereafter introduces the pre-treated animal waste by-products into the combustion chamber of the combustion heat generator for full complete combustion thereof. Thus, resulting in production of clean usable energy in the form of heat.

BACKGROUND OF THE INVENTION

Reducing animal waste/manure, particularly emissions from animal feed lots or stables also including harmful fuel odors and particulates, has become a strong environmental objective and is of extreme concern throughout the world. As a result, because of worldwide tightening of pollution emission standards, inventors have and are continuously trying to invent devices, methods and/or systems that will comply with these increasingly stringent standards. However, heretofore such attempts have not been successful as they are much too costly to produce, are very complicated requiring numerous parts and/or are simply inefficient.

Examples of somewhat related prior art include the extraction of energy from wastes using anaerobic digestion and the general technology is old and well known. Such prior art has been used to treat sewage sludge, and often the resulting biogas has been used to maintain the digester temperature, to run internal combustion engines, etc. Many small units were used in France and Algeria after World War II, and in India and China, many homes and farms have used biogas for everyday activities such as cooking, hot water heating, etc. However, such examples have proven to be inferior and not environmentally friendly. Other attempts to resolve treatment of animal waste include use of electrochemical fuel cells and, in particular, to the utilization of organic materials, such as animal waste products, for the generation of electricity.

Such attempts within the known prior art are extremely complicated. The prior art use numerous parts, are substantially limited to anaerobic digestion, and nowhere did the applicant find any system similar to the present invention that has been simplified, improved and eliminates all of the disadvantages associated with the prior art.

It is to be noted the present invention is greatly needed and resolves animal waste disposal in a manner heretofore not taught. The annual accumulation of organic waste in the world is immense. For example, the annual accumulation of pig generated organic waste in Taiwan alone is estimated to be over 12 million tons. In addition to the need to address the environmental concerns associated with the disposal of such waste, it has been recognized that waste of this nature could be a valuable source of energy.

Therefore, the present invention is unique as it teaches a new simplified system for total combustion of the waste material that results in usable pure clean energy unlike any other prior art related hereto. Furthermore the present system is unique as this system eliminates virtually all compounds such as hydrocarbons, carbon monoxide, odors and organic and inorganic particulates from heating exhausted and still be energy efficient, such as taught by the present invention and significantly reduce oxides of nitrogen (NOx).

SUMMARY OF THE INVENTION

It is therefore a primary object of the present invention to provide a new system and/or method for converting organic material, such as animal waste including by-products thereof, into heat/electricity that is more efficient than known methods.

Another object of the present invention is to provide a system for treating animal waste that substantially eliminates all offensive odors associated with the animal waste.

It is therefore an object of the present invention to provide a combustion heat generator that overcomes the drawbacks and disadvantages associated within the known prior art. For example, the present invention has been simplified and accomplishes unusual results heretofore not achieved. The combustion heat generator itself is substantially formed from an external housing and an internal housing in combination that are separated via an air space, respectively. The internal housing providing the combustion/incinerator area or chamber and also includes flow conditioners that control velocity and swirling of the gases.

Another object of the present invention is to provide a combustion heat generator that requires little or no maintenance, as it is extremely efficient and durable.

Still another object of the present invention is to provide a combustion heat generator that can be easily manufactured, is extremely cost effective and marketable.

It is a very important object of the present invention to provide a combustion heat generator that eliminates all, or at least a very large percentage, such as 99.99% of all the fuel used, liquid or gas.

Yet another important object of the present invention is to provide a combustion heat generator wherein all of the typical pre-existing components, such as the fuel dispensing means, igniters, blowers, etc., can be used with the current combustion heat generator without the need for any modifications.

Another object of the present invention is to provide a combustion heat generator that can be used with any type of liquid fuel of choice, such as high-octane aviation fuel, heating oils, kerosene, alcohol, propane, diesel, etc., or virtually anything that can be atomized into the chamber and ignited.

Still another object of the present invention is to provide a new system and/or method for converting organic material, that may be either manually controlled and operated, or the system may be controlled and operated by a computer having appropriate programming. This is determined by the needs of the end user and/or engineering preferences.

Other objects and advantages will be seen when taken into consideration with the following specification and drawings, etc. However, it is to be noted the following is exemplary of one possible embodiment and thus the invention is not to be limited thereto.

DETAILED DESCRIPTION OF THE DRAWINGS

Figure 1:
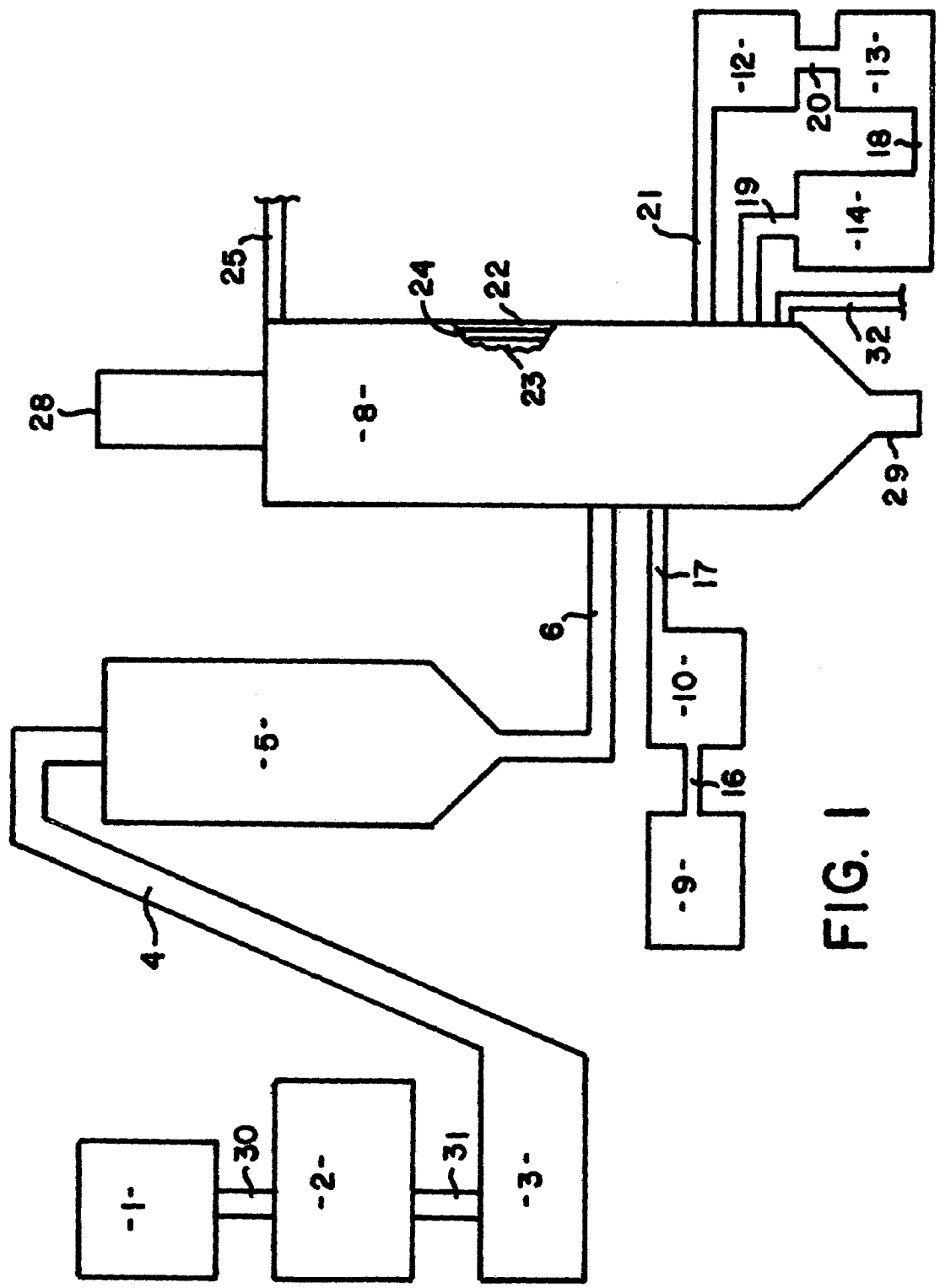
FIG. 1 is substantially a plan overview of the present system.

Referring now in detail to the drawings wherein like characters refer to like elements therein. The present system for converting animal waste and/or by-products thereof into an environmentally friendly energy source is of very simple construction substantially comprising of pre-existing prior art components that when combined as taught herein provide unusual results heretofore not taught, such as follows:

As depicted herein within FIG. 1, the system uses a vortex grinder/dehydration system having an air grinder and/or other associated typical components therewith. It is to be understood any suitable variant of this type of grinder/dehydration system of engineering choice may be incorporated. However, through experimentation one suitable grinder/dehydration system as produced by Windhexe™ has proven to be most efficient and cost effective and is represented and incorporated herein by grinder/dehydration system (2).

As further depicted herein within FIG. 1, the system also includes a hopper (3) having typical components associated therewith, a first waste transfer means (30), a second waste transfer means (31), a third waste transfer means (4), a holding container (5), waste receiving means (6), air/fuel regulator means (7) with associated components (later described) and a combustion heat generator (8) in combination.

The unusual results are mainly achieved due to use of the combustion heat generator that is used to convert the waste by-products into heat/electrical energy. It is to be understood any suitable variant of these components of engineering choice may be incorporated, as there are numerous variations available. For example, the hopper (3) is typical and no modifications are required, the third waste transfer means (4) can be of any suitable type such as a conveyer belt, auger, airlift system, etc., and the holding container (5) is typical and no modifications are required.

However, the combustion heat generator (8) is resultant from my co-pending application No. 60/534,509 and due to its specific design provides the unusual results attained herein. Thus the present invention is not limited to use of the other components but it is substantially limited to use of the novel combustion heat generator (8) as taught within my prior art and incorporated herein.

Figure 2:
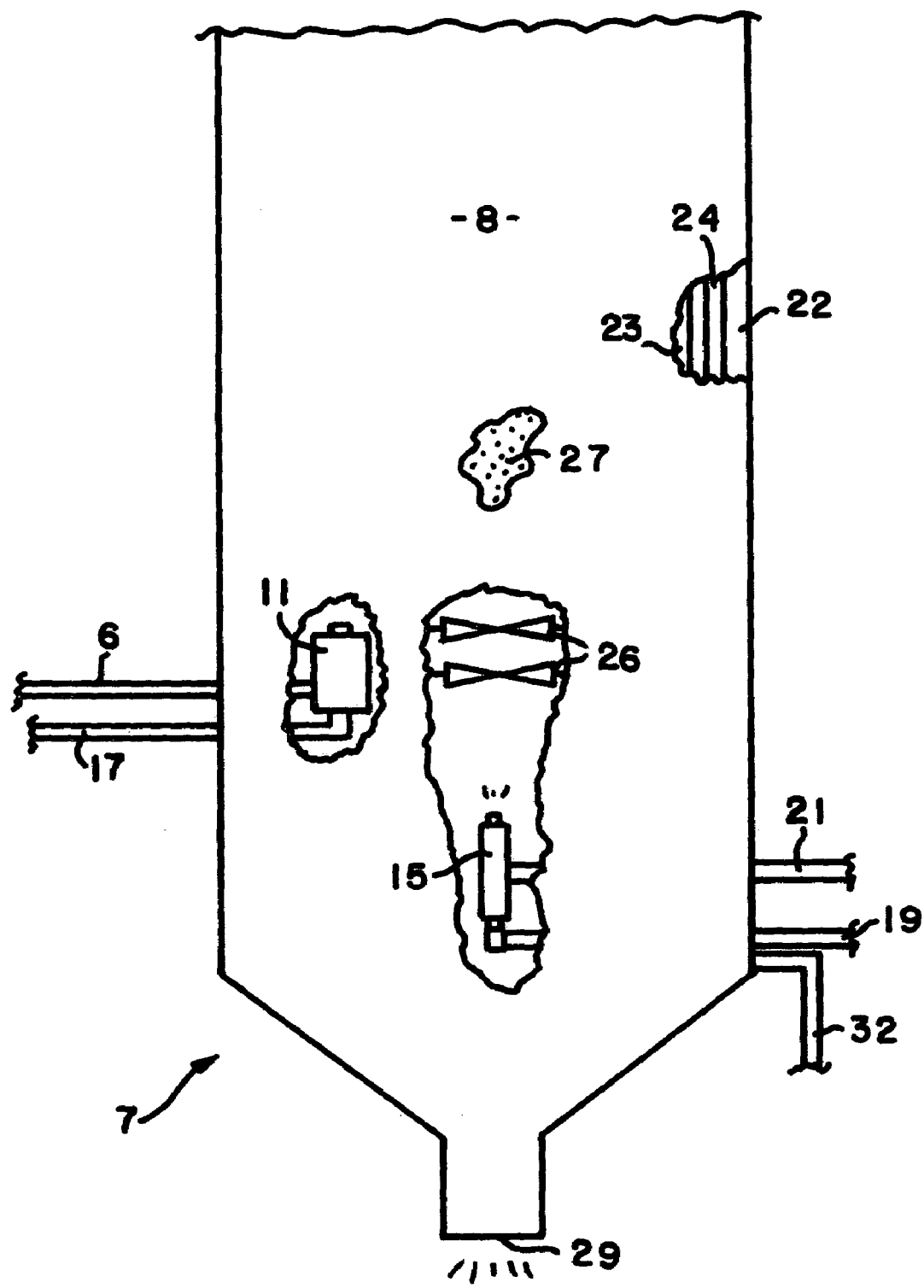
FIG. 2 is substantially an enlarged view of the air/fuel regulator means with associated components and the combustion heat generator in combination, respectively.

Referring now to both FIGS. 1 and 2 wherein the air/fuel regulator means (7) with associated components is more clearly defined including an air compressor (9), air control valve (10), air controlled venturi nozzle (11), a by-pass control valve (12), a fuel tank (13), a fuel pump (14) and a pressure atomizing nozzle (15).

Air compressor (9) being connected in-line via air hose (16) to air control valve (10) for delivering compressed air thereto. Air control valve (10) being connected in-line via input tube (17) to air controlled venturi nozzle (11) for delivering regulated air thereto. Waste holding container (5) being connected in-line via waste receiving means (6) to air controlled venturi nozzle (11) for delivering pre-treated waste material thereto. Fuel tank (13) being connected in-line via fuel line (18) to fuel pump (14), for delivering fuel thereto. Fuel pump (14) being connected in-line via fuel inlet tube (19) to pressure atomizing nozzle (15) for delivering regulated fuel thereto. Fuel tank (13) being connected in-line via fuel input tube (20) to bypass control valve (12) for delivering fuel thereto. Bypass control valve (12) being connected in-line via fuel delivery line (21) to pressure atomizing nozzle (15) for delivering regulated fuel thereto.

With further reference to combustion heat generator (8), it is to be noted the construction thereof includes an external housing (22) and an internal housing (23) that are separated or partitioned by an internal space (24) and the internal space (24) is in open communication with cooling and combustion air inlet (25) (see FIG. 1) for further maintaining proper operating temperatures of the system. Also, each housing (22 & 23) are made from a high heat resistant material of engineering choice.

As can further be seen in FIG. 2, combustion heat generator (8) also includes flow conditioner discs (26). It is believed the noted unusual results are mainly achieved due to the construction of the flow conditioner discs (26) that are positioned within the internal housing (23). Whereby, each of the flow conditioner discs (26) are substantially in the form of a circular disc (made from a high heat resistant material) which is of a shape and size to be horizontally positioned within internal housing (23). It is to be understood each of the flow conditioner discs (26) can be fixedly attached in place by any suitable attachment means of choice, such as by welding or the like. Also, there are many variations for the actual construction of each of the flow conditioner discs (26) therefore the invention is not to be limited to any particular shape or size. However, the embodiment as disclosed within my prior art application addresses the actual construction and perimeters for the various possible configurations. Wherein each of the flow conditioner discs (26), are further defined having multiple slits there through which when bent outwardly form vanes, respectively, with each of the vanes directing airflow in a controlled angular manner upwardly and outwardly there from. Each of the flow conditioner discs (26) include multiple locating tabs thereon that allow the flow conditioner discs to be correctly orientated within internal housing (23) which is most advantageous.

The flow conditioner discs (26) when formed do not include any centralized opening which is important as this does not allow the gases to escape there through, rather the gases are substantially restricted which in turn provides increased dwell time. This restriction can be accomplished in a number of ways, such as each flow conditioner disc (26) may include multiple cross bars that function to deflect, condition and block the gases from escaping from the central area, respectively until proper dwell time has been achieved.

It can now be seen due to flow conditioner discs (26), the fuel/air/waste/mixture when transferred into the combustion area (27) of internal housing (23) are forced into a spiraling motion that in turn provides the unusual results. For example, when the waste, etc., is forced into the combustion area into the vanes of the flow conditioner discs (26), the noted spiraling motion thereof causes the heavier materials i.e. hydrocarbons, carbon and any other heavy molecules of the fuel therein to be completed combusted or incinerated and thereafter the now waste free hot air/gases are directed upward and outwardly from within the combustion area (27) of internal housing (23) via exhaust outlet (28) (see FIG. 1) and may then be converted to energy by any suitable heat exchange system of engineering choice (not shown). Whereby, due to use of the flow conditioner discs (26), the system provides highly increased dwell and/or burn time and this is the key or secret to total combustion. This is easily accomplished due to the variable angle of the vanes on the flow conditioner (26) discs that set the direction and velocity of the swirling gases.

It can now be seen due to the novel and unique characteristics of the combustion heat generator (8) as taught within my prior art and herein, when the proper amount of atomized fuel/air/waste/mixture is injected into the combustion area, total combustion of the mixture is achieved and the waste is completely destroyed. Thus, producing usable heat and a fine fly ash that is expelled via fly ash vent/fresh air inlet (29) and may be used for friendly environmental purposes. Fly ash vent/fresh air inlet (29) further provides fresh air that is automatically drawn into and/or forced into the system and functions to further maintain proper operating temperatures.

OPERATION AND FUNCTION

Referring now in general to the overall operating system as follows: It is to be noted the present system may be either manually controlled and operated, or it can be computer operated by appropriate programming, either way is optional As can be seen in FIG. 1, upon activation of air/fuel regulator means (7), initial start up is initiated via either liquid or gaseous fuel being injected into the combustion area (27) of the combustion heat generator (8) via pressure atomizing nozzle (15). Thus, providing proper operating temperature (such as between 1300 and 2000 degrees) of the system before any animal waste product (1) is delivered thereto. Whereby in operation after initial startup, animal waste product (1) is delivered into the grinder/dehydration system (2) via an appropriate first waste transfer means (30). Within the grinder/dehydration system (2) the animal waste product (1) is transformed into a finely ground dehydrated powder like waste material and is then transferred into the hopper (3) by a suitable second waste transfer means (31). Thereafter the finely ground dehydrated powder like waste material is diverted into the holding container (5) via the third waste transfer means (4).

It is to be noted any suitable type of waste transfer means (4) may be incorporated. For example it may be in the form of a conveyer belt, auger, airlift system, etc., thus the invention is not to be limited thereto. After the finely ground dehydrated powder like waste material is delivered into the holding container (5) it is then directed downward and outwardly there from in a regulated controlled manner and then into the waste receiving means (6) for deliverance into the air controlled venturi nozzle (11). Thereafter, the air controlled venturi nozzle (11) injects the finely ground dehydrated powder like waste material into the combustion area (27) for further processing.

As previously noted, the actual construction and function of the combustion heat generator (8) has been taught within my co-pending application. However, the system as taught therein is slightly modified as follows: Whereby, a compressed air delivery means has been eliminated as pressure atomizing nozzle (15) only uses fuel as delivered by the fuel pump (14), fuel tank (13) and bypass control valve (12) in combination.

Another feature not previously incorporated includes a cool air inlet port (32) for delivering cool air around the injection system (7), namely nozzle(s) (11 & 15). It is to be noted this cooling air is functional for keeping the air injection system with nozzles at the desired temperature and also keeps ash and other material from accumulating on the nozzles and further serves to act as augmentation air to the combustion process.

It can now be seen due to the novel and unique characteristics of the combustion heat generator (8) as taught within my prior art and as modified herein, when the proper amount of atomized fuel/air/waste/mixture is injected into the combustion area (27), total combustion of the atomized fuel/air/waste/mixture is achieved and the waste product is completely destroyed. Thus, producing usable heat and a fine fly ash that is expelled via a fly ash vent/fresh air inlet (14) and may be used for environmental purposes. Also, fresh air is drawn or forced into vent (14) and thus further helps to maintain proper operating temperatures.

It can now be seen I have herein provided a new and novel system for converting animal waste into useable clean heat for environmentally friendly energy purposes. The system is simple, easy to install, requires very little maintenance, is functional with any type of fuel or gas, is extremely efficient and completely eliminates any pollution in a manner heretofore not taught.

Although the invention has been herein shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatuses.

Having described my invention, what I claim as new and desire to secure by Letters Patent is:

1. A system for converting animal waste and/or by-products thereof into an environmentally friendly energy source in combination comprising: a waste product; a first waste transfer means; a grinder/dehydration system; a second waste transfer means; a hopper; a third waste transfer means; a holding container; a waste receiving means; an air/fuel regulator means; and a combustion heat generator; said air/fuel regulator means comprising: an air compressor; an air control valve; an air controlled venturi nozzle; a by-pass control valve; a fuel tank; a fuel pump; and a pressure atomizing nozzle; said air compressor is connected in-line via an air hose to said air control valve for delivering compressed air thereto, said air control valve being connected in-line via an input tube to said air controlled venturi nozzle for delivering regulated air thereto, said holding container being connected in-line via said waste receiving means to said air controlled venturi nozzle for delivering pre-treated said waste product thereto, said fuel tank being connected in-line via a fuel line to said fuel pump for delivering fuel thereto, said fuel pump being connected in-line via a fuel inlet tube to said pressure atomizing nozzle for delivering regulated said fuel thereto, said fuel tank being connected in-line via a fuel input tube to said by-pass control valve for delivering said regulated fuel thereto, and said by-pass control valve being connected in-line via a fuel delivery line to said pressure atomizing nozzle for delivering said regulated fuel thereto, upon initial startup said waste product is delivered via said first waste transfer means into said grinder/dehydration system wherein said waste product is transformed into a finely ground dehydrated powder material which is then transferred via said second waste transfer means into said hopper, said finely ground dehydrated powder material is then diverted via said third waste transfer means into said holding container and said finely ground dehydrated powder material is then directed from said holding container via said waste receiving means into said air/fuel regulator means for final processing within said combustion heat generator.

2. The system of claim 1 wherein said combustion heat generator comprising: an external housing; an internal housing; a cooling/combustion air inlet; flow conditioner discs; a combustion area; an exhaust outlet; a vent/fresh air inlet; and a cool air inlet port; said external housing and said internal housing are partitioned forming an internal space there between, said internal space is in open communication with said cooling/combustion air inlet for further maintaining proper operating temperatures within said system, and said flow conditioner discs being positioned within said internal housing, whereby:

when atomized fuel/air/waste/mixture is injected into said combustion area of said combustion heat generator, total combustion of said atomized fuel/air/waste/mixture is achieved, thus producing usable heat and a fine fly ash that is expelled via said fly ash vent/fresh air inlet and may be used for friendly environmental purposes.

3. The system of claim 2 wherein each said housing and said flow conditioner discs are made from a high heat resistant material.

4. The system of claim 2 wherein said proper operating temperatures are between 1300 and 2000 degrees.

* * * * *